United States Patent
Perez et al.

(10) Patent No.: US 10,493,922 B2
(45) Date of Patent: Dec. 3, 2019

(54) RE-CONFIGURABLE CENTER CONSOLE ASSEMBLY

(71) Applicant: Nissan North America, Inc., Franklin, TN (US)

(72) Inventors: Roque Valenzuela Perez, Estado de Mexico (MX); Makoto Haraguchi, Northville, MI (US); Melaina Vasko, Highland, MI (US); Brent Hagan, Columbia, TN (US); Trenton Wright, Arrington, TN (US)

(73) Assignee: Nissan North America, Inc., Franklin, TN (US)

( * ) Notice: Subject to any disclaimer, the term of this patent is extended or adjusted under 35 U.S.C. 154(b) by 142 days.

(21) Appl. No.: 15/718,505

(22) Filed: Sep. 28, 2017

(65) Prior Publication Data
US 2019/0092243 A1 Mar. 28, 2019

(51) Int. Cl.
| | |
|---|---|
| *B60R 7/04* | (2006.01) |
| *B60N 3/10* | (2006.01) |
| *B60N 2/75* | (2018.01) |
| *B60R 11/02* | (2006.01) |
| *B60R 11/00* | (2006.01) |
| *B60R 16/02* | (2006.01) |

(52) U.S. Cl.
CPC ............. *B60R 7/04* (2013.01); *B60N 2/793* (2018.02); *B60N 3/103* (2013.01); *B60R 11/0241* (2013.01); *B60R 11/0252* (2013.01); *B60R 16/02* (2013.01); *B60R 2011/0007* (2013.01); *B60R 2011/008* (2013.01); *B60R 2011/0288* (2013.01)

(58) Field of Classification Search
CPC ......... B60R 7/04; B60R 7/08; B60R 11/0252; B60R 11/0241; B60N 2/793; B60N 3/103
USPC ...................................................... 296/24.34
See application file for complete search history.

(56) References Cited

U.S. PATENT DOCUMENTS

| | | | | |
|---|---|---|---|---|
| 8,939,491 | B2 * | 1/2015 | Gillis ..................... | B60N 3/101 296/24.34 |
| 9,539,954 | B2 | 1/2017 | Felkins et al. | |
| 2010/0090487 | A1 * | 4/2010 | Carnevali ............. | B60N 3/101 296/24.34 |
| 2011/0215605 | A1 * | 9/2011 | Spitler .................... | B60N 3/00 296/24.34 |
| 2017/0144613 | A1 * | 5/2017 | Catlin ................. | B60R 11/0241 |
| 2017/0201115 | A1 * | 7/2017 | Stickley ............. | B60R 11/0241 |

* cited by examiner

*Primary Examiner* — Jason S Morrow
(74) *Attorney, Agent, or Firm* — Global IP Counselors, LLP

(57) ABSTRACT

A re-configurable center console assembly includes a center console assembly and a phone holder tray. The center console assembly has a main body that includes a first side wall and a second side wall defining a concaved storage area therebetween. The first side wall and the second side wall further define a plurality of retaining positions therebetween. The phone holder tray has a first side portion, a phone supporting portion and a second side portion. The first side portion is configured to manually attach, detach and re-attach to the first side wall. The second side portion is also configured to attach, detach and re-attach to the second side wall such that the phone holder tray is installed to a first of the plurality of retaining positions and is detachable and re-attachable to a second of the plurality of retaining positions.

17 Claims, 14 Drawing Sheets

RE-CONFIGURABLE CENTER CONSOLE ASSEMBLY

BACKGROUND

Field of the Invention

The present invention generally relates to a re-configurable center console assembly. More specifically, the present invention relates to a re-configurable center console assembly that includes a storage area configured to receive a phone holder tray such that the phone holder tray is installable, removeable and re-installable to any of a plurality of differing locations above the storage area.

Background Information

Modern vehicles typically include a center console assembly that includes cup holders. A shortcoming of many center console assemblies is the lack of storage space for a mobile device, such as a mobile phone.

SUMMARY

One object of the present disclosure is to provide a center console assembly with a space configured to receive a mobile communication device, such as a mobile phone, where the mobile phone is visible to a vehicle operator.

Another object of the present disclosure is to provide a center console assembly with flexible positioning of a phone holder tray that is configured to receive a mobile communication device, such as a mobile phone.

Another object of the present disclosure is to provide a center console assembly and a phone holder tray where the phone holder tray snap-fits in place to the center console assembly and can be easily removed from the center console assembly and re-installed at differing locations on the center console assembly.

In view of the state of the known technology, one aspect of the present disclosure is to provide a re-configurable center console assembly includes a center console assembly and a phone holder tray. The center console assembly has a main body that includes a first side wall and a second side wall defining a concaved storage area therebetween. The first side wall and the second side wall further define a plurality of retaining positions therebetween. The phone holder tray has a first side portion, a phone supporting portion and a second side portion. The first side portion is configured to manually attach, detach and re-attach to the first side wall. The second side portion is also configured to attach, detach and re-attach to the second side wall such that the phone holder tray is installed to a first of the plurality of retaining positions and is detachable and re-attachable to a second of the plurality of retaining positions.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
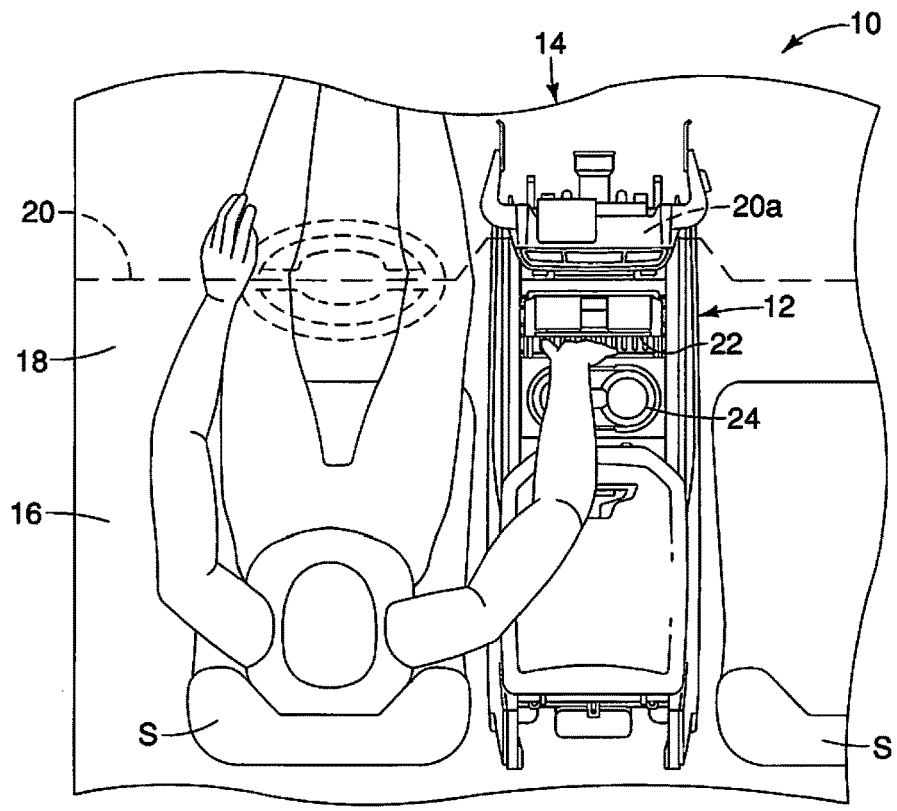
FIG. 1 is a top view of a passenger compartment of a vehicle showing a center console assembly having a phone holder tray and a cup holder tray in accordance with a first embodiment.
Figure 2:
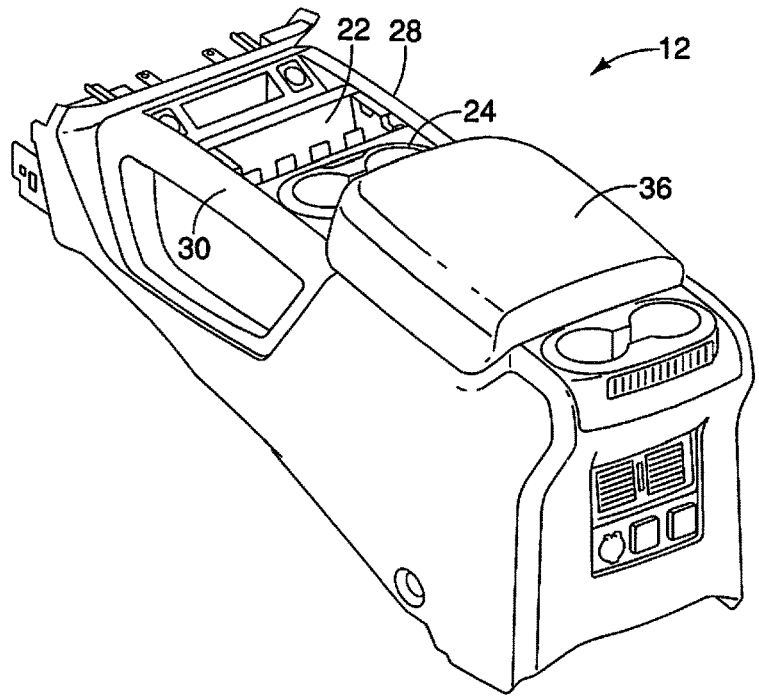
FIG. 2 is a perspective view of the center console assembly shown removed from the vehicle in accordance with the first embodiment.
Figure 3:
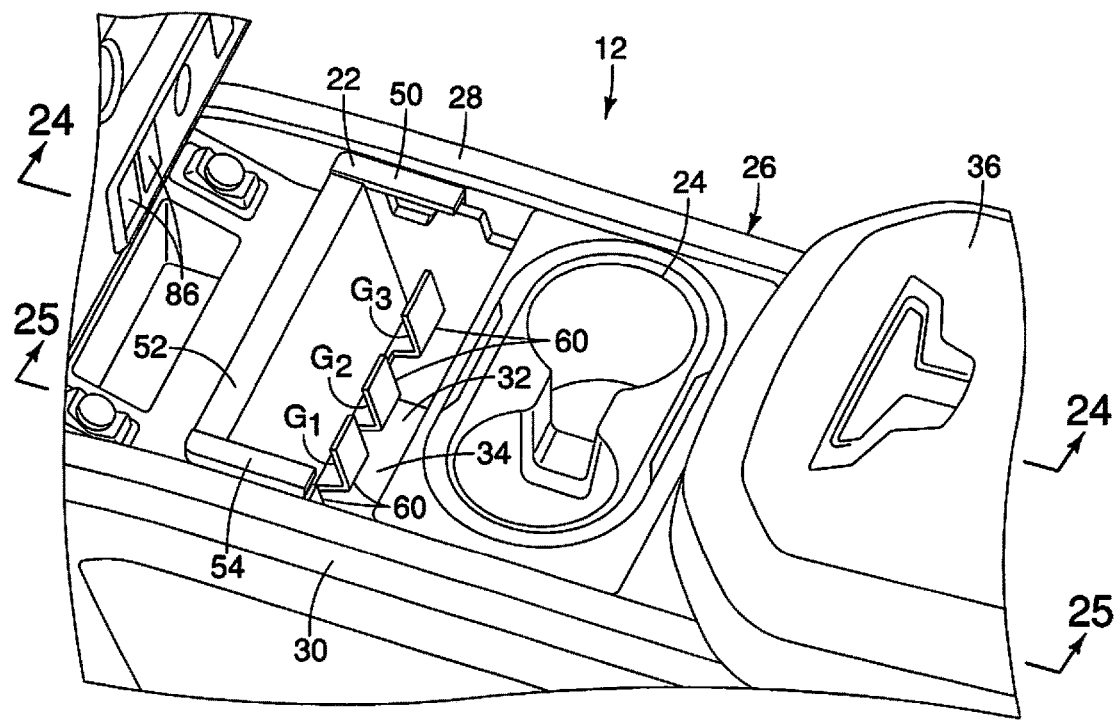
FIG. 3 is another perspective view of the center console assembly showing a concaved storage area with the phone holder tray installed to a first of a plurality of retaining positions defined within the center console assembly and a cup holder tray installed to another of the plurality of retaining positions in accordance with the first embodiment.
Figure 4:
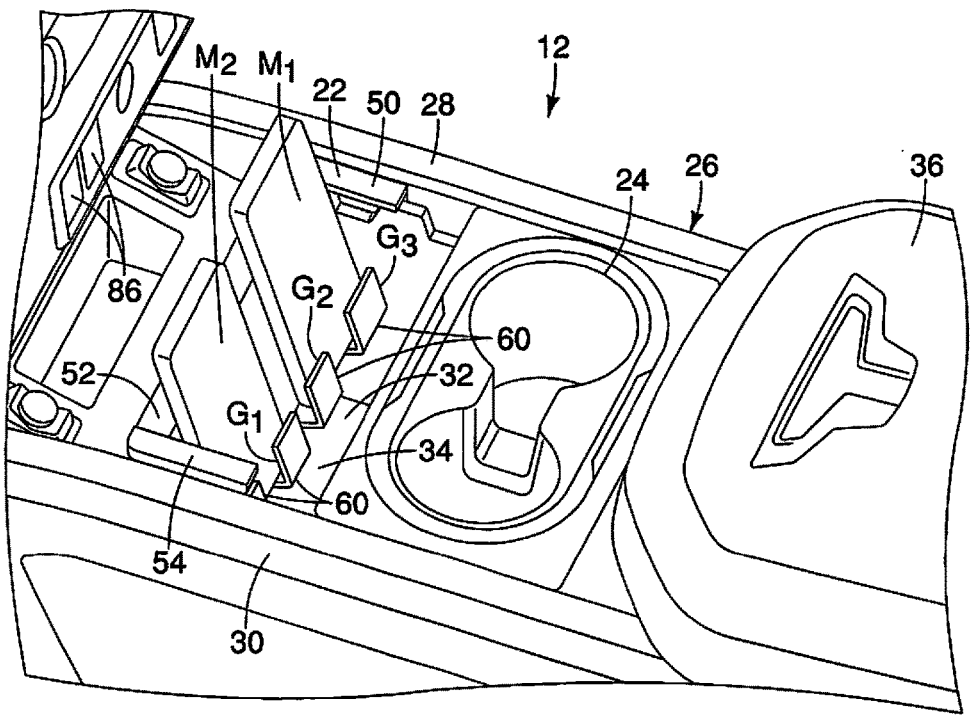
FIG. 4 is another perspective view of the center console assembly, similar to FIG. 3, showing the phone holder tray installed to center console assembly with two mobile phones located within the phone holder tray in accordance with the first embodiment.

Referring initially to FIG. 1, a vehicle 10 that includes a re-configurable center console assembly 12 is illustrated in accordance with a first embodiment.

The vehicle 10 includes a vehicle body structure 14 that defines a passenger compartment 16 partially defined by a floor 18. An instrument panel 20 and the re-configurable center console assembly 12 are installed to the vehicle body structure 14 within the passenger compartment 16. For example, the instrument panel 20 is installed to structural elements (not shown) of the vehicle body structure 14 such as a dash-wall (not shown) and/or a cross-member (not shown) that extends in a vehicle lateral direction from a passenger's side of the passenger compartment 16 to a driver's side (opposite the passenger's side) of the passenger compartment 16 above the floor 18. Since vehicle body structures, cross-members and instrument panels are conventional vehicle structures, further description is omitted for the sake of brevity.

Figure 24:
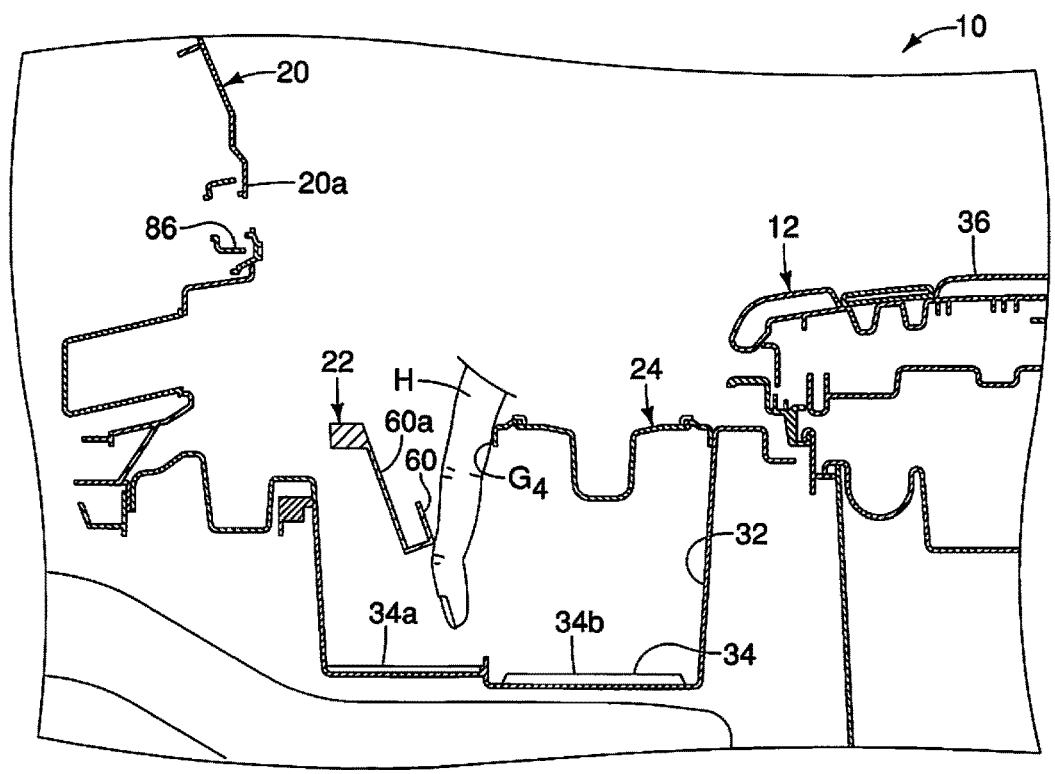
FIG. 24 is a cross-sectional view of the center console assembly taken along the line 24-24 in FIG. 3, showing the phone holder tray installed to the first of the plurality of retaining positions and the cup holder tray shown installed to the fourth of the plurality of retaining portions in accordance with the first embodiment.
Figure 25:
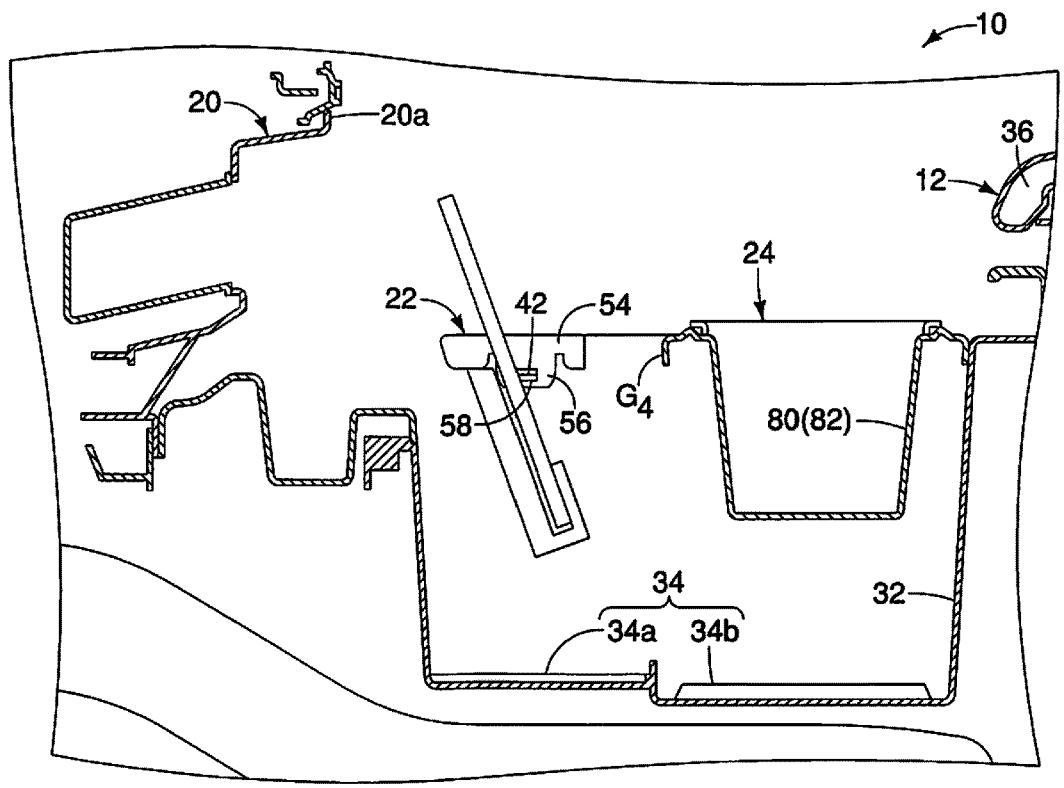
FIG. 25 is another cross-sectional view of the center console assembly taken along the line 25-25 in FIG. 3, showing the phone holder tray installed to the first of the plurality of retaining positions and the cup holder tray shown installed to the fourth of the plurality of retaining portions in accordance with the first embodiment.

The re-configurable center console assembly 12 (hereinafter referred to simply as the console assembly 12) is mounted to the floor 18 and is approximately centered between the passenger's side and the driver's side of the passenger compartment 16 and between front seats S. Further, the console assembly 12 can optionally abut and optionally extend at least partially beneath a central section 20a of the instrument panel 20, as shown in FIGS. 1, 24 and 25. Alternatively, the console assembly 12 extends forward to an area adjacent to the central section 20a of the instrument panel 20.

The console assembly 12 includes a phone holder tray 22 and a cup holder tray 24, as shown in FIGS. 2-7. Both the phone holder tray 22 and the cup holder tray 24 are removable from the center console 12, re-positionable and re-attachable to the console assembly 12 in a manner that is described in greater detail below, following a description of the console assembly 12.

Figure 14:
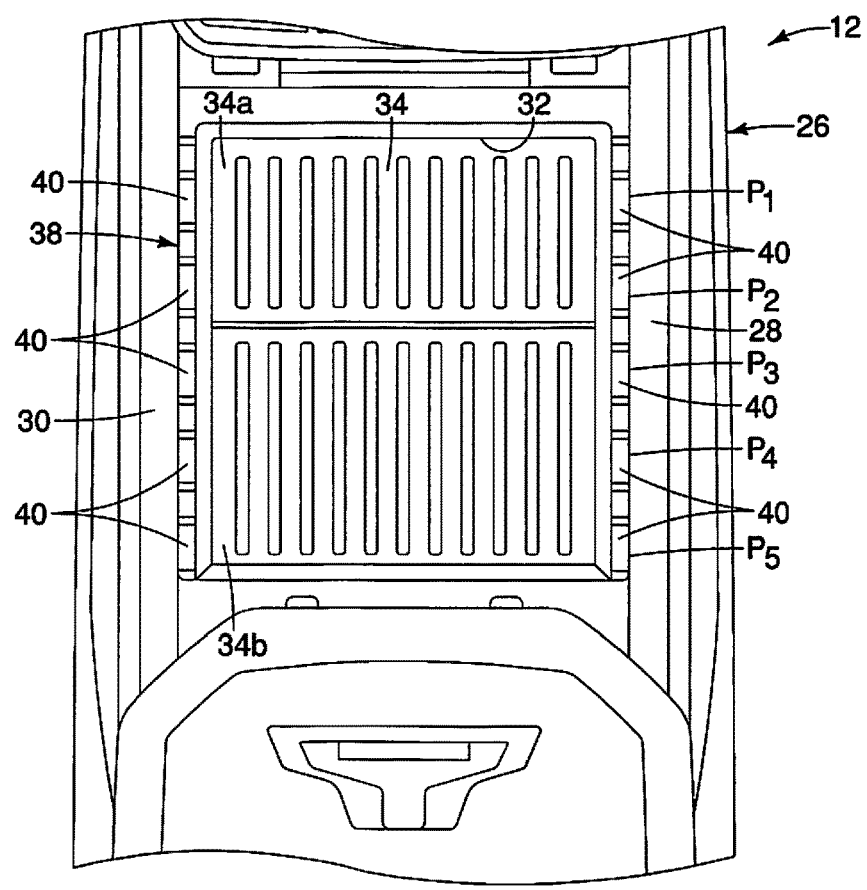
FIG. 14 is a top view of the center console assembly showing the concaved storage area with the phone holder tray and the cup holder tray removed therefrom in accordance with the first embodiment.
Figure 15:
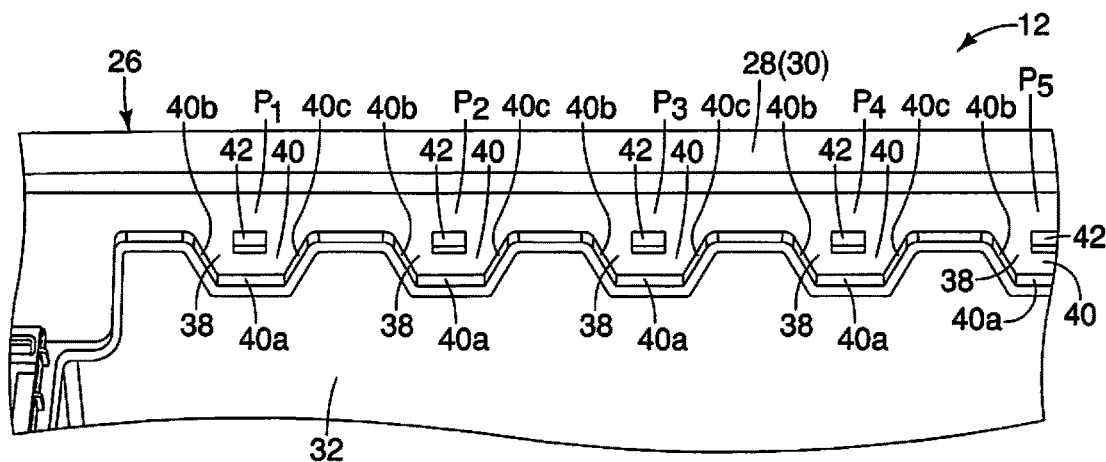
FIG. 15 is a side view of a first side wall of the center console assembly showing a plurality of tray receiving concavities, each of the plurality of tray receiving concavities defining one of the plurality of retaining positions along with a corresponding one of a plurality of tray receiving concavities on a second side wall of the center console assembly opposite the first side wall, in accordance with the first embodiment.
Figure 16:
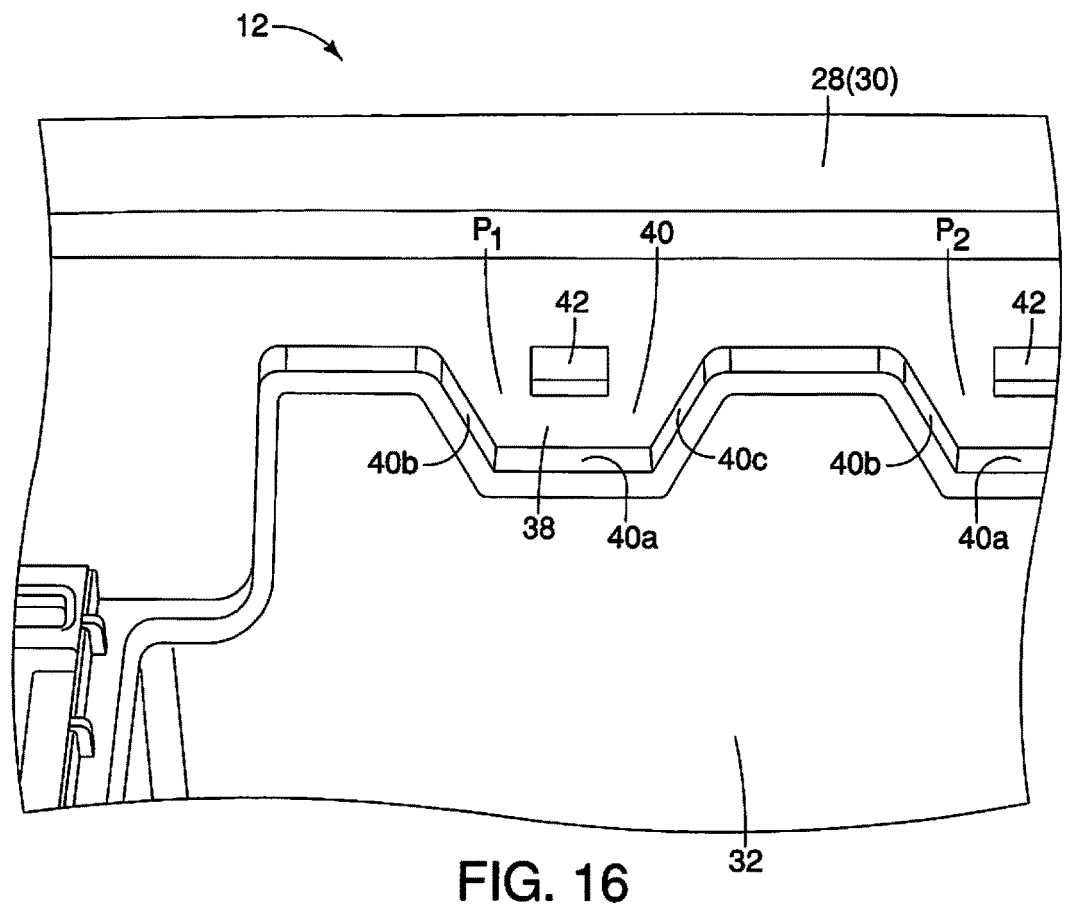
FIG. 16 is another side view of the first side wall of the center console assembly showing one of the plurality of tray receiving concavities in accordance with the first embodiment.
Figure 26:
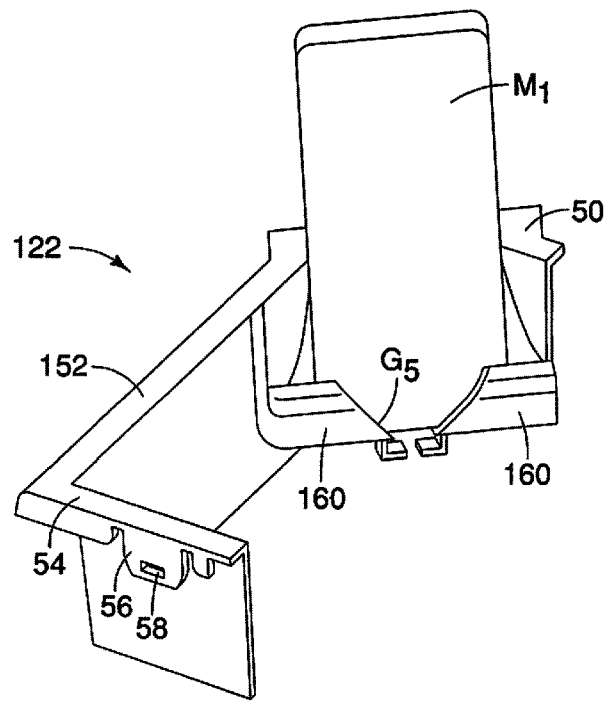
FIG. 26 is a first perspective view of a phone tray holder in accordance with a second embodiment.

As shown in FIGS. 2-7 and 14, the console assembly 12 includes a main body 26 that includes a first side wall 28 and a second side wall 30. A concaved storage area 32 is defined between the first side wall 28 and the second side wall 30. As shown in FIGS. 14, 25 and 26, the concaved storage area 32 can have a bottom wall 34 that includes a first section 34a and a second section 34b defining two storage areas, one being deeper than the other. The main body 26 also includes an armrest 36 at a rearward portion of the console assembly 12. The armrest 36 can be attached to the main body 26 by a hinge (not shown) such that the armrest 36 is movable between an open position revealing a storage compartment rearward of the concaved storage area 32 and a close position concealing the storage compartment, as shown in FIG. 24.

The phone holder tray 22 and the cup holder tray 24 are described with reference to FIGS. 8-13, after a description of the main body 26 of the console assembly 12.

Figure 17:
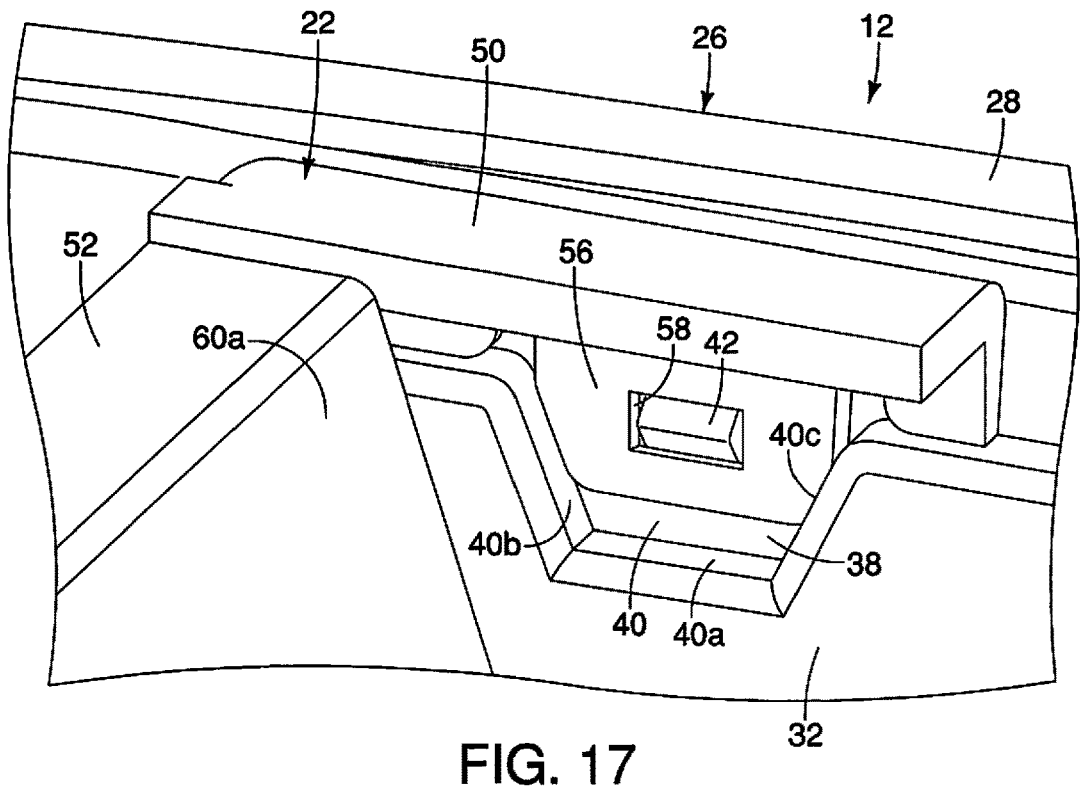
FIG. 17 is perspective view of the first side wall of the center console assembly showing one of the vertically oriented flanges of the phone holder tray installed to one of the plurality of tray receiving concavities in the first side wall in accordance with the first embodiment.
Figure 18:
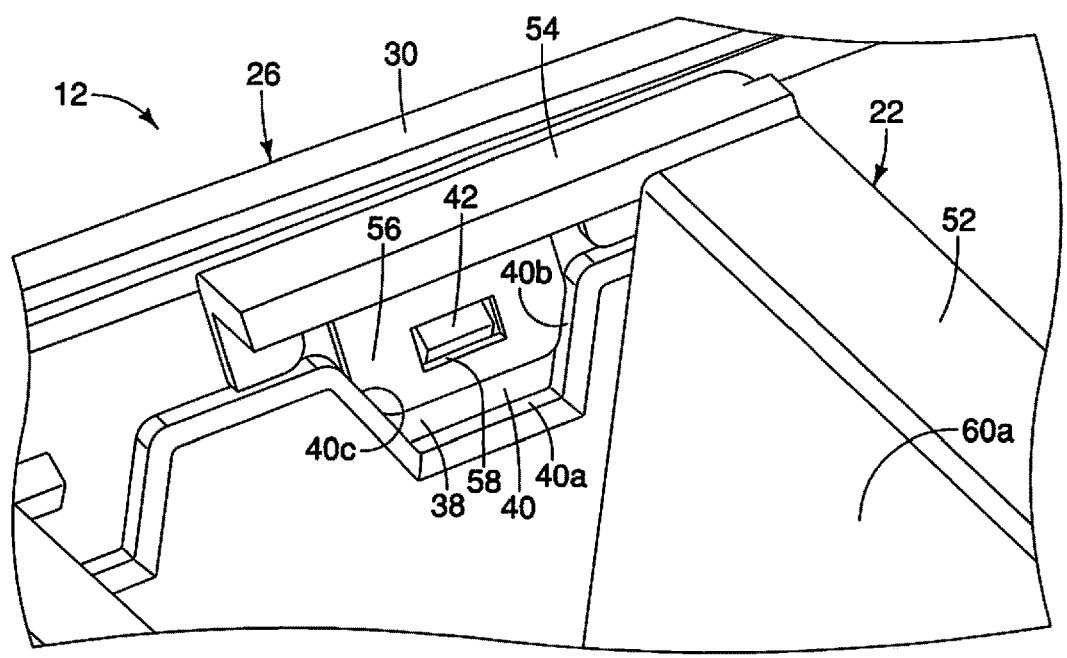
FIG. 18 is a perspective view of the second side wall of the center console assembly showing another one of the vertically oriented flanges of the phone holder tray installed to one of the plurality of tray receiving concavities in the second side wall in accordance with the first embodiment.

As shown in FIGS. 14-18, both the first side wall 28 and the second side wall 30 further include a plurality of retaining positions 38. Each one of the retaining portions 38 of the first side wall 28 is laterally aligned with a corresponding one of the retaining portions 38 of the second side wall 30. The shape and dimensions of each of the retaining portions 38 of the first side wall 28 are the same as the retaining portions 38 of the second side wall 28, except that retaining portions 38 of the first side wall 28 are mirror images relative to the retaining portions 38 of the second side wall 30 (mirror images of one another), as shown in FIGS. 17-18.

Each of the retaining portions 38 is defined a tray receiving concavity 40 that can be formed into each of the first side wall 28 and the second side wall 30. Specially, the first and second side walls 28 and 30 can be formed by injection molding or other molding process to form and define each of the retaining portions 38 adjacent to upper inward edges thereof. Alternatively, separate tracks (not shown) that include the retaining portions 38 can be installed within the concaved storage area 32 of the console assembly 12 along upper inward edges of each of the first and second side walls 28 and 30. Each tray receiving concavity 40 has a lower surface 40a and opposing inclined side surfaces 40b and 40c. Each of the tray receiving concavities 40 includes a projection 42 approximately centered between the opposing inclined side surfaces 40b and 40c, above the lower surface 40a.

Each of the first side wall 28 and the second side wall 30 includes five separate the retaining portions 38. The aligned pairs of the retaining portions 38 define five different retaining positions $P_1$, $P_2$, $P_3$, $P_4$ and $P_5$.

A description of the phone holder tray 22 is now provided with specific reference to FIGS. 3-7 and 9-13. The phone holder tray 22 has a first side portion 50, a phone supporting portion 52 and a second side portion 54. Each of the first side portion 50 and the second side portion 54 is configured to manually attached, detach and re-attach to aligned pairs of the retaining portions 38 at any one of the retaining positions $P_1$, $P_2$, $P_3$, $P_4$ and $P_5$. Specifically, each the first side portion 50 and the second side portion 54 of the phone holder tray 22 includes a vertically oriented flange 56 (also referred to as support section 56) formed with a projection receiving section 58 that is dimensioned and shaped to receive one of the projections 42 of the tray receiving concavities 40 of the retaining positions 38 of the console assembly 12. In the depicted embodiment, the projection receiving sections 58 are apertures or openings that receive the projection 42. Alternatively, the projection receiving sections 58 can be indentations or concaved areas of the vertically oriented flanges 56.

As shown in FIGS. 17 and 18, when the support section 56 of the first side portion 50 and the support section 56 of the second side portion 52 of the phone holder tray 22 are inserted into the aligned pairs of tray receiving concavities 40 at one of the retaining positions $P_1$, $P_2$, $P_3$, $P_4$ and $P_5$, the phone holder tray 22 snap-fits into position. Removal of the phone holder tray from one of the retaining positions $P_1$, $P_2$, $P_3$, $P_4$ and $P_5$, requires a moderate level of upward force, causing the support sections 56 to deflect slightly, thus making the phone holder tray 22 detachable (removable) and re-attachable to any one of the retaining positions $P_1$, $P_2$, $P_3$, $P_4$ and $P_5$ the console assembly 12 with relative ease.

Figure 20:
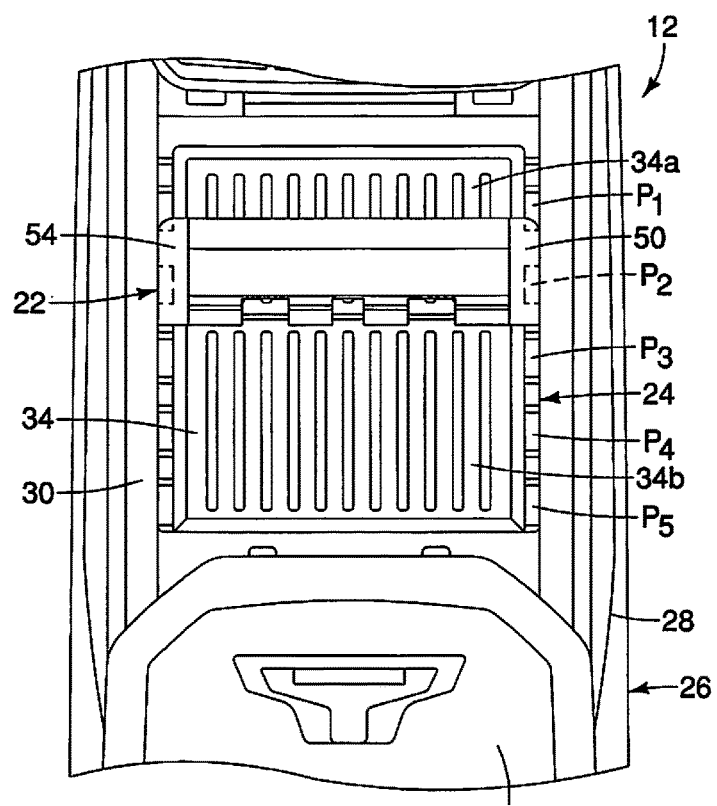
FIG. 20 is another top view of the center console assembly, similar to FIGS. 14 and 19, showing the phone holder tray installed to a second of the plurality of retaining positions with the cup holder tray removed therefrom in accordance with the first embodiment.
Figure 21:
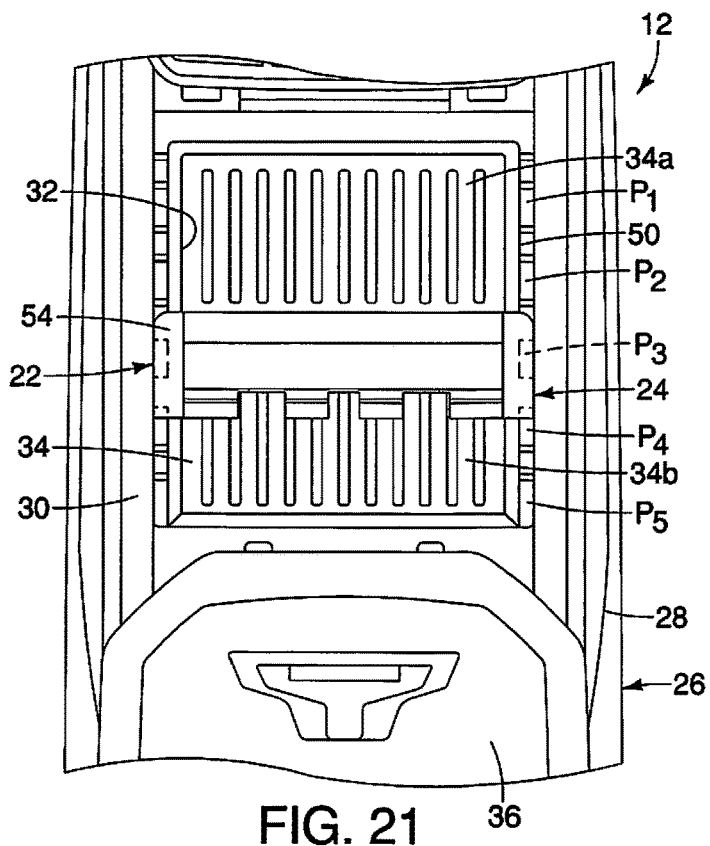
FIG. 21 is another top view of the center console assembly, similar to FIGS. 14, 19 and 20, showing the phone holder tray installed to a third of the plurality of retaining positions with the cup holder tray removed therefrom in accordance with the first embodiment.
Figure 22:
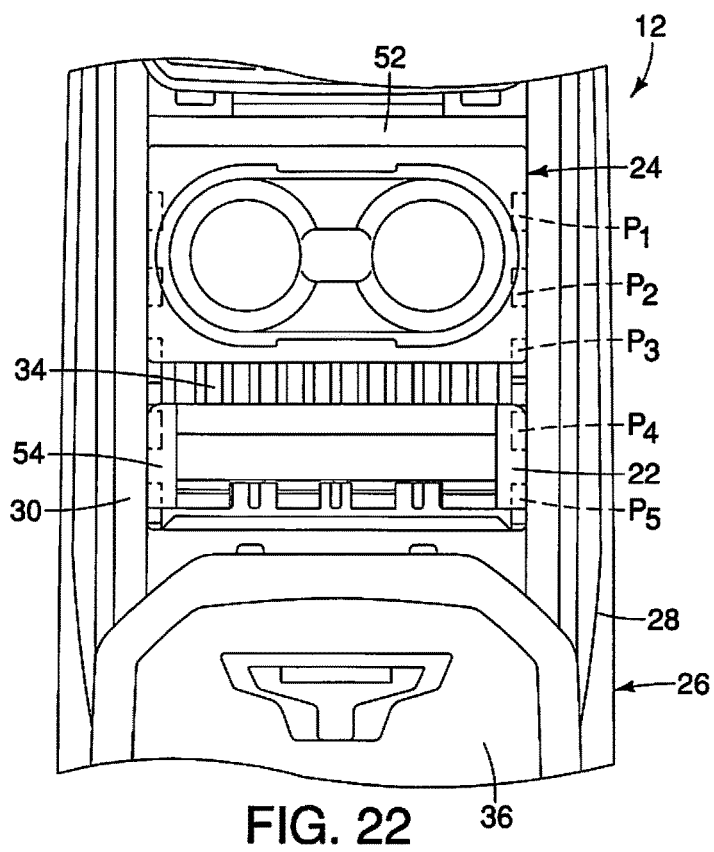
FIG. 22 is another top view of the center console assembly, similar to FIGS. 14 and 19-21, showing the phone holder tray installed to the fourth of the plurality of retaining positions with the cup holder tray installed to the second of the plurality of retaining positions in accordance with the first embodiment.
Figure 23:
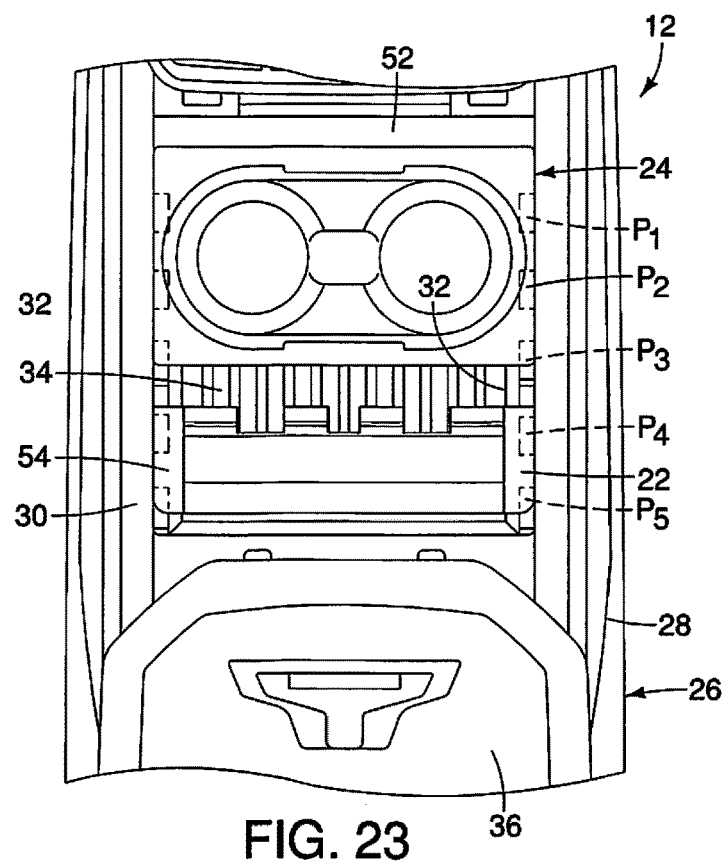
FIG. 23 is another top view of the center console assembly, similar to FIGS. 14 and 19-22, showing the phone holder tray installed to the fifth of the plurality of retaining positions with the cup holder tray installed to the second of the plurality of retaining positions in accordance with the first embodiment.

FIGS. 1, 3-7 and 19 show the phone holder tray 22 attached to the console assembly 12 at the retaining position $P_1$. FIG. 20 shows the phone holder tray 22 attached to the console assembly 12 at the retaining position $P_2$. FIG. 21 shows the phone holder tray 22 attached to the console assembly 12 at the retaining position $P_3$. FIG. 22 shows the phone holder tray 22 attached to the console assembly 12 at the retaining position $P_4$. Further, FIG. 23 shows the phone holder tray 22 attached to the console assembly 12 at the retaining positions $P_5$.

Figure 5:
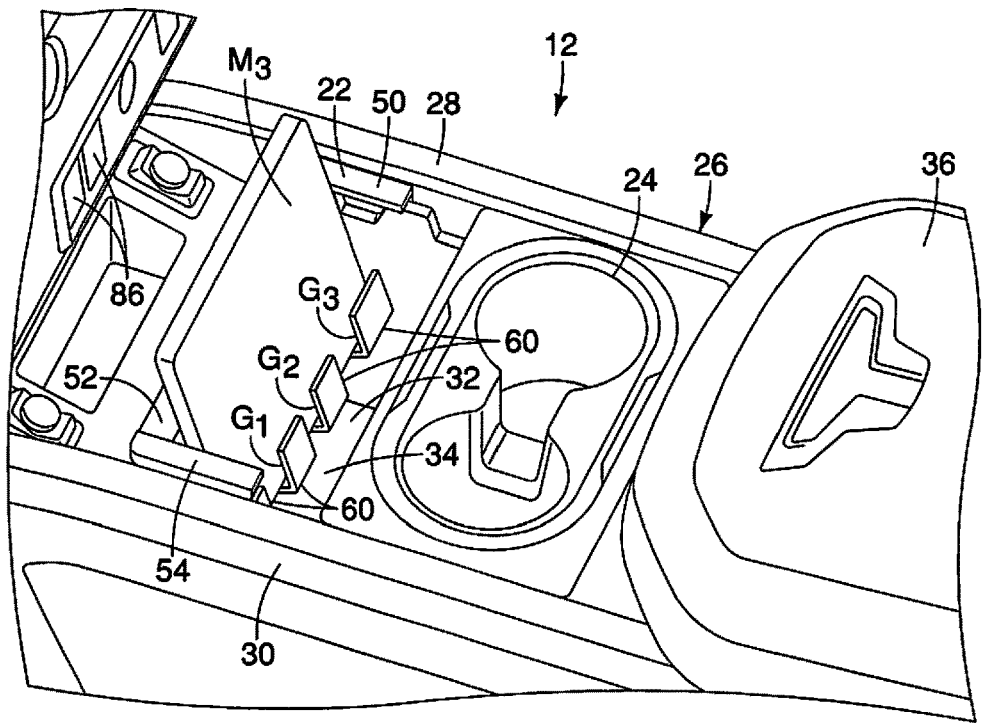
FIG. 5 is another perspective view of the center console assembly, similar to FIGS. 3 and 4, showing the phone holder tray installed to center console assembly with an electronic tablet located within the phone holder tray in accordance with the first embodiment.
Figure 13:
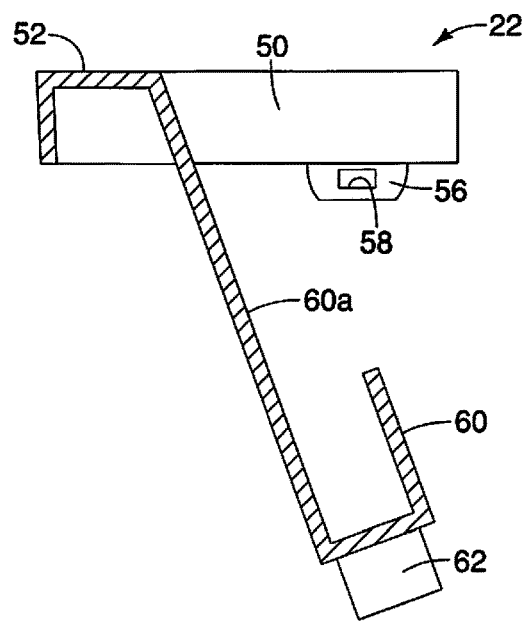
FIG. 13 is a side cross-sectional view of the phone holder tray showing a wall section of a phone supporting portion of the phone holder tray in accordance with the first embodiment.

The phone supporting portion 52 of the phone tray holder 22 extends from the first side portion 50 to the second side portion 54. The phone supporting portion 52 includes wall sections 60 that are dimensioned and oriented to support two separate mobile phones $M_1$ and $M_2$, as shown in FIGS. 1, 4, 6 and 7. More specifically, the wall sections 60 extend from a back wall 60a such that the back wall 60a and each of the wall sections 60 defines a U-shape when viewed from the side, as shown in FIG. 13. The back wall 60a, and the surfaces of the wall sections 60 provide a space that cradles each of the mobile phones $M_1$ and $M_2$. As shown in FIG. 5, the wall sections 60, the back wall section 60a and the phone supporting portion 52 is further dimensioned to support an electronic tablet $M_3$.

The wall sections 60 include or define a plurality of gaps $G_1$, $G_2$ and $G_3$. The gaps $G_1$ and $G_3$ are dimensioned and positioned to receive cables C attachable to respective bottom ends of each of the mobile phones $M_1$ and $M_2$. The gap $G_2$ is a centered gap relative to the entire phone supporting portion 52 that is dimensioned and positioned to receive a cable C attachable to the tablet $M_3$.

Figure 10:
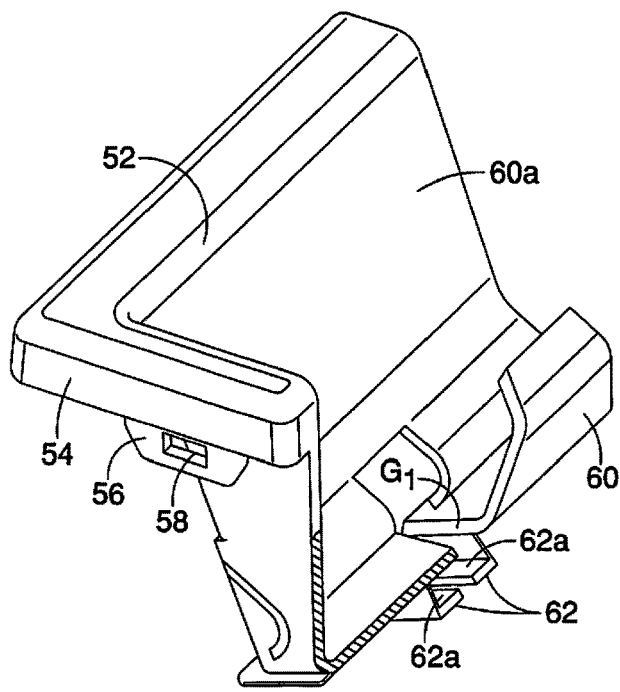
FIG. 10 is another perspective view of the phone holder tray with cut-away portions showing the vertically oriented flange and cable retaining features of the phone holder tray in accordance with the first embodiment.
Figure 11:
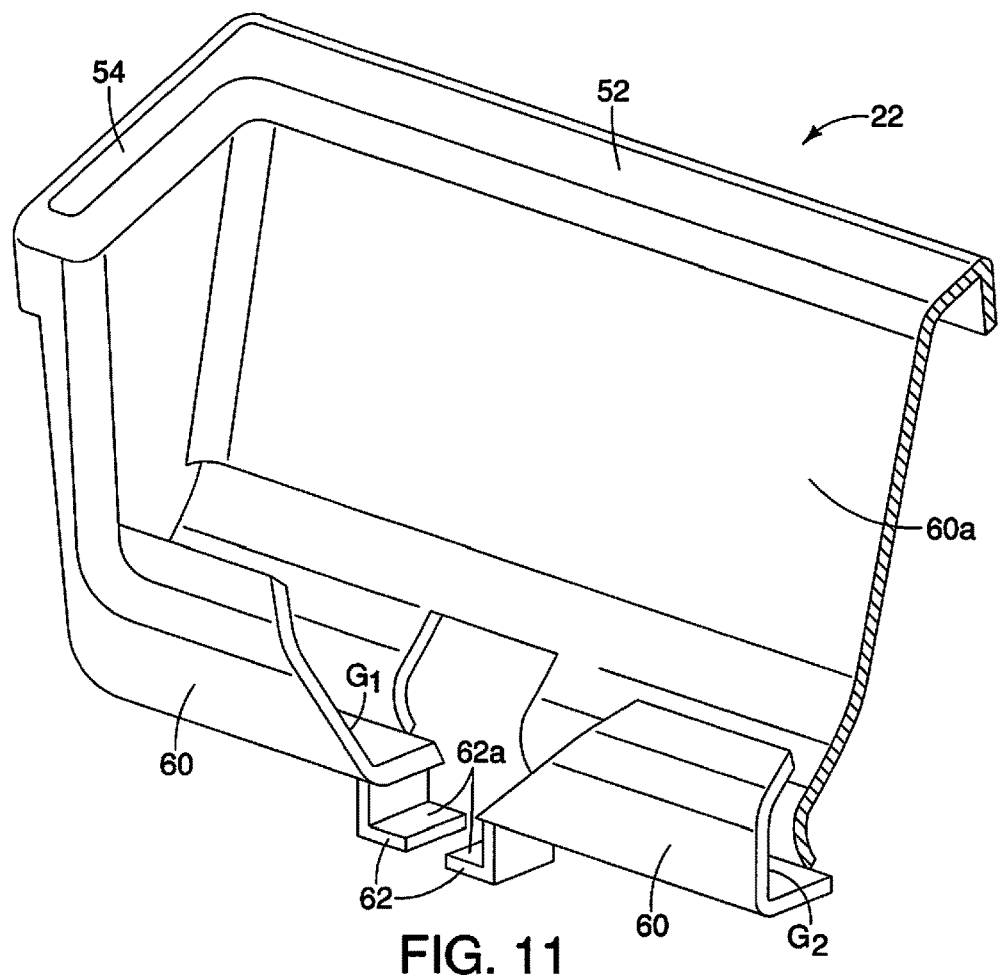
FIG. 11 is a perspective cut-away view of the phone holder tray showing the cable retaining features of the phone holder tray in accordance with the first embodiment.
Figure 12:
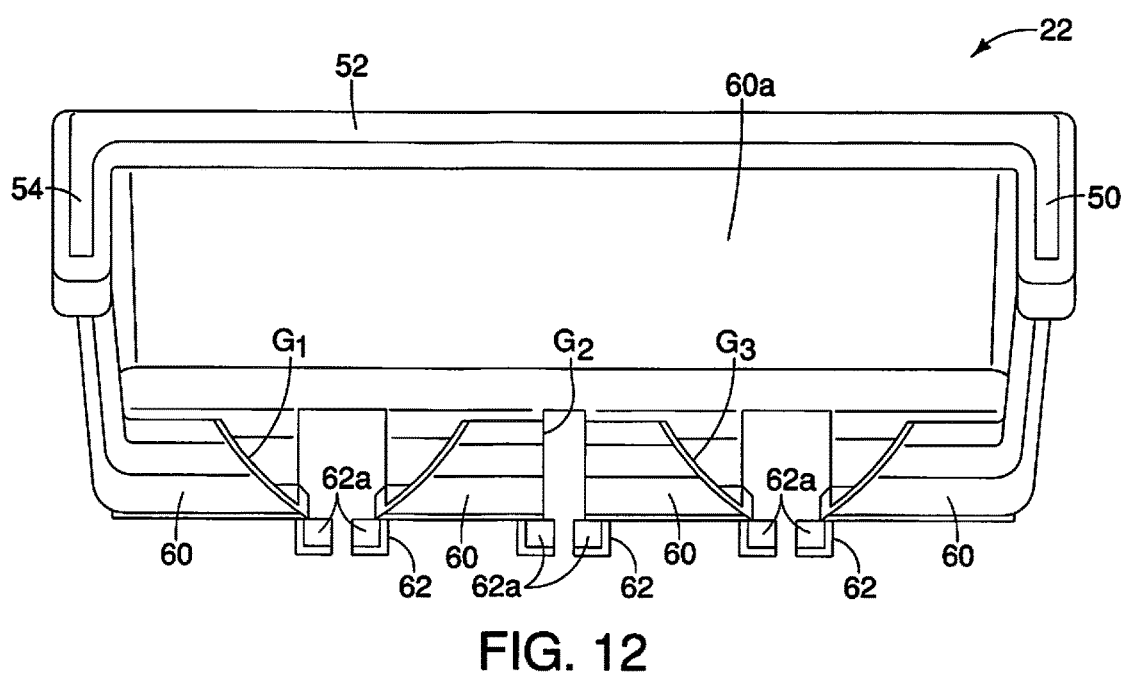
FIG. 12 is a front view of the phone holder tray showing the cable retaining features of the phone holder tray in accordance with the first embodiment.

The area below the wall sections 60 can be unadorned, or, as shown in FIGS. 10-12, the lower area of the wall sections 60 can optionally include a plurality of pairs of projections 62 that define electrical jack supporting surfaces 62a. The electrical jack supporting surfaces 62a are located along opposite sides of each of the plurality of gaps $G_1$, $G_2$ and $G_3$, and are dimensioned and positioned to receive corresponding electrical jacks J of the cables C.

Figure 8:
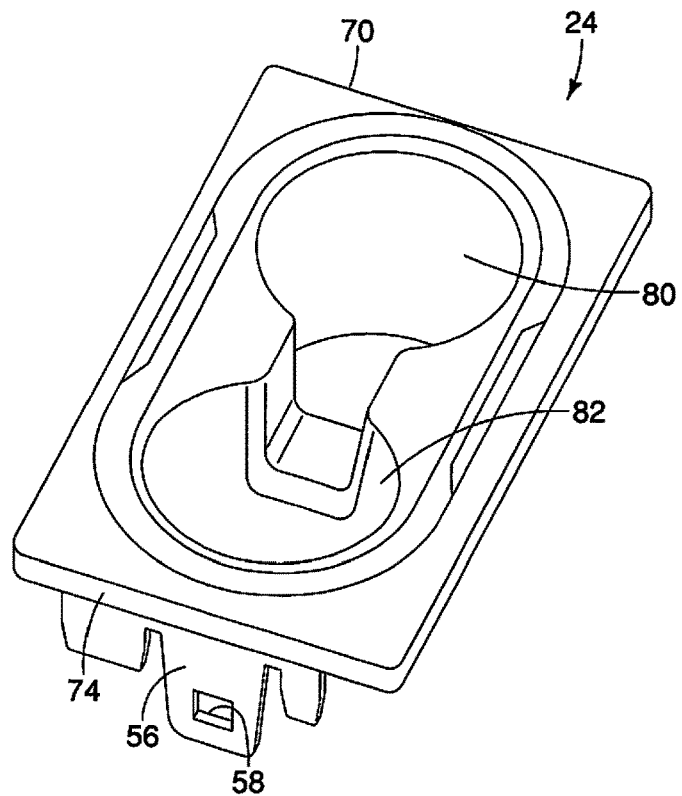
FIG. 8 is a perspective view of the cup holder tray shown removed from the center console assembly in accordance with the first embodiment.
Figure 9:
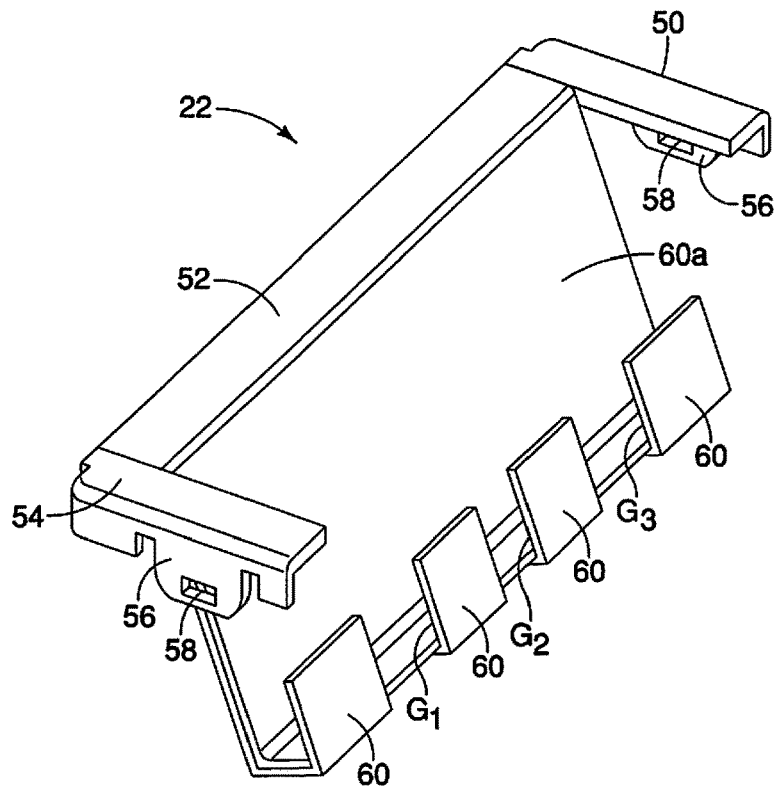
FIG. 9 is a perspective view of the phone holder tray shown removed from the center console assembly showing a phone supporting portion and a vertically oriented flange in accordance with the first embodiment.

As shown in FIG. 8, the cup holder tray 24 has a third side portion 70, a cup holding portion 72 and a fourth side portion 74. Like the first side portion 50 and the second side portion 54 of the phone holder tray 22, each of the third side portion 70 and the fourth side portion 74 include the vertically oriented flange 56 (the support section 56) and the projection receiving section 58 where the vertically oriented flanges 56 are identical to those described above with respect to the phone holder tray 22. Thus, the third side portion 70 and the fourth side portion 74 are configured to manually attached, detach and re-attach to the first side wall 28 and the second side wall 30, respectively, of the console assembly 12 in a manner identical to that of the phone holder tray 22.

Figure 19:
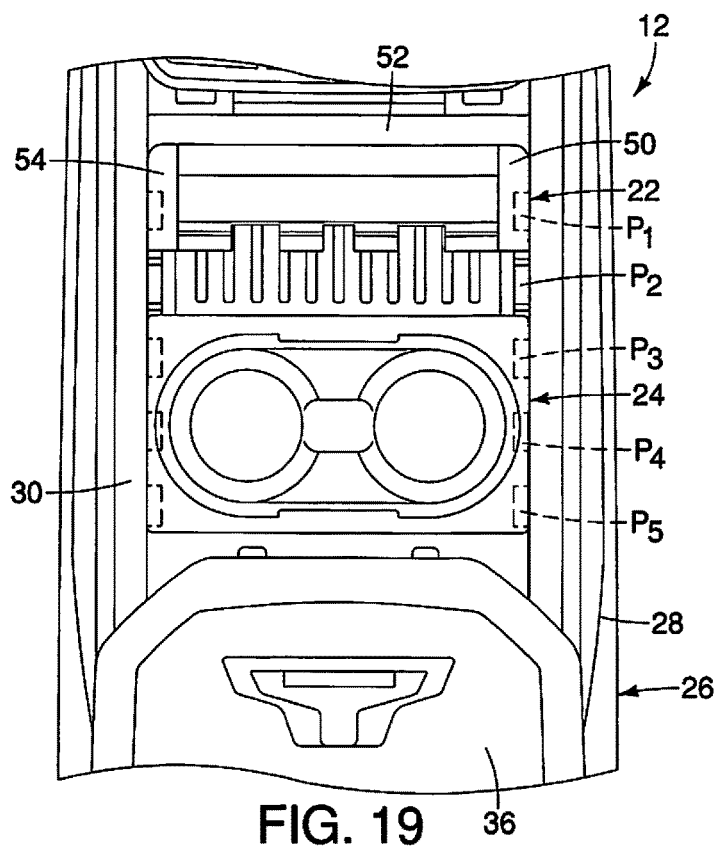
FIG. 19 is another top view of the center console assembly, similar to FIG. 14, showing the phone holder tray installed to the first of the plurality of retaining positions and the cup holder tray shown installed to a fourth of the plurality of retaining portions in accordance with the first embodiment.

As shown in FIG. 19 with the phone tray holder 22 attached at the retaining position $P_1$, the cup holder tray 24 can only be attached at the retaining position $P_4$, due to the fact that the cup holder tray 24 is wider in a vehicle longitudinal direction as compared to the phone holder tray 22. In other words, with the vertically oriented flanges 56 of the cup holder tray 24 installed or attached at the retaining position $P_4$, the cup holder tray 24 covers (and conceals) the tray receiving concavities 40 that define the retaining position $P_5$.

As shown in FIGS. 22 and 23 with the phone tray holder 22 attached at one of the retaining position $P_4$ and $P_5$, the cup holder tray 24 can only be attached at the retaining position $P_1$, respectively. Further, with the vertically oriented flanges 56 of the cup holder tray 24 installed or attached at the retaining position $P_1$, the cup holder tray 24 covers (and conceals) the tray receiving concavities 40 that define the retaining position $P_2$. In FIG. 22, the phone tray holder 22 is attached at the retaining position $P_1$, but is reversed such that the mobile phone is place into the phone tray holder 22 at an angle opposite the angle depicted in, for example, FIG. 4. It should be understood from the drawings and the description herein that the phone tray holder 22 can also be installed to the console assembly 12 such that the vertically oriented flanges 56 are installed to the retaining position $P_5$.

As shown in FIGS. 20 and 21, in the depicted embodiment, with the phone tray holder 22 attached at the retaining position $P_3$, the cup holder tray 24 is preferably completely removed from the console assembly 12. It should be understood from the drawings and the description herein, that the overall dimensions of console assembly 12, the phone tray holder 22 and the cup holder tray 24 can be easily adjusted such that both the phone tray holder 22 and the cup holder tray 24 can both be installed to the console assembly 12 at additional locations beyond the various combination of locations shown in the drawings. In other words, the present disclosure in not limited to a console assembly with only five retaining positions, but can include a greater number of retaining positions or a lesser number of retaining positions.

As shown in FIG. 8, the cup holding portion 72 of the cup holder tray 24 includes two cup receiving concavities 80 and 82. However, in an alternative embodiment (not shown), the cup holding portion 72 of the cup holder tray 24 can be modified to include only one cup receiving concavities, or can be modified to include three or four cup receiving concavities.

Figure 6:
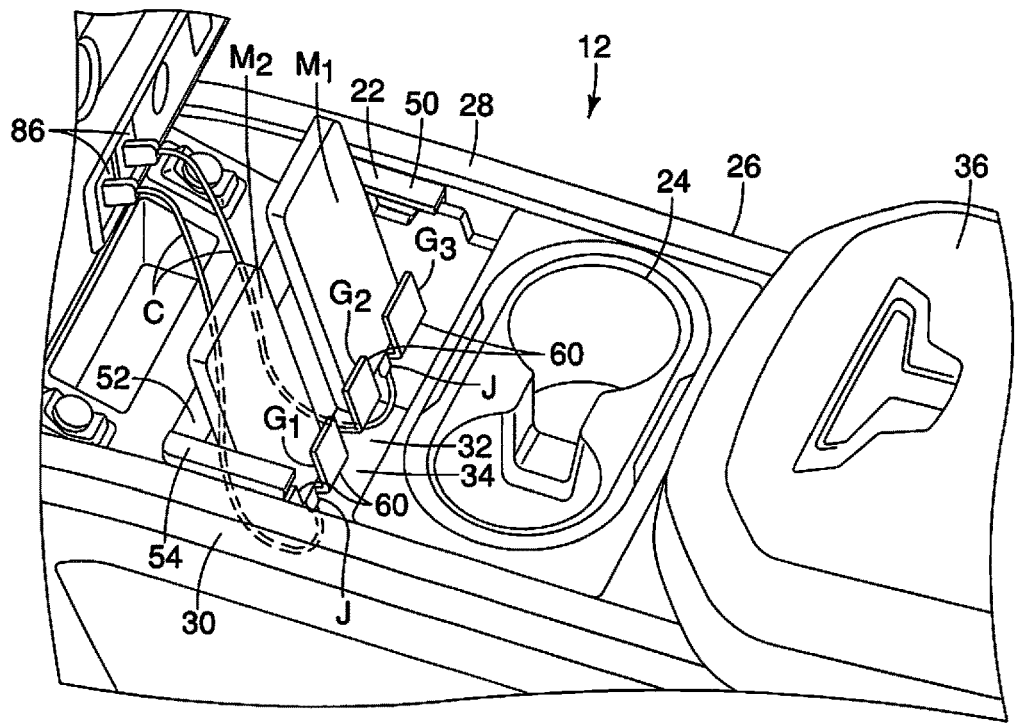
FIG. 6 another perspective view of the center console assembly showing the phone holder tray installed to center console assembly with two mobile phones located within the phone holder tray showing routing of cables connecting the mobile phones to connection ports in an instrument panel of the vehicle in accordance with the first embodiment.

As shown in FIG. 6, the central section 20a of the instrument panel 20 can include outlets 86, such as USB ports, for connection to any of the mobile phones $M_1$ and $M_2$, and/or the electronic tablet $M_3$. The phone holder tray 22 can include recesses 88 that allow the cable C to be routed out of the concaved storage area 32 to the outlets 86.

Figure 7:
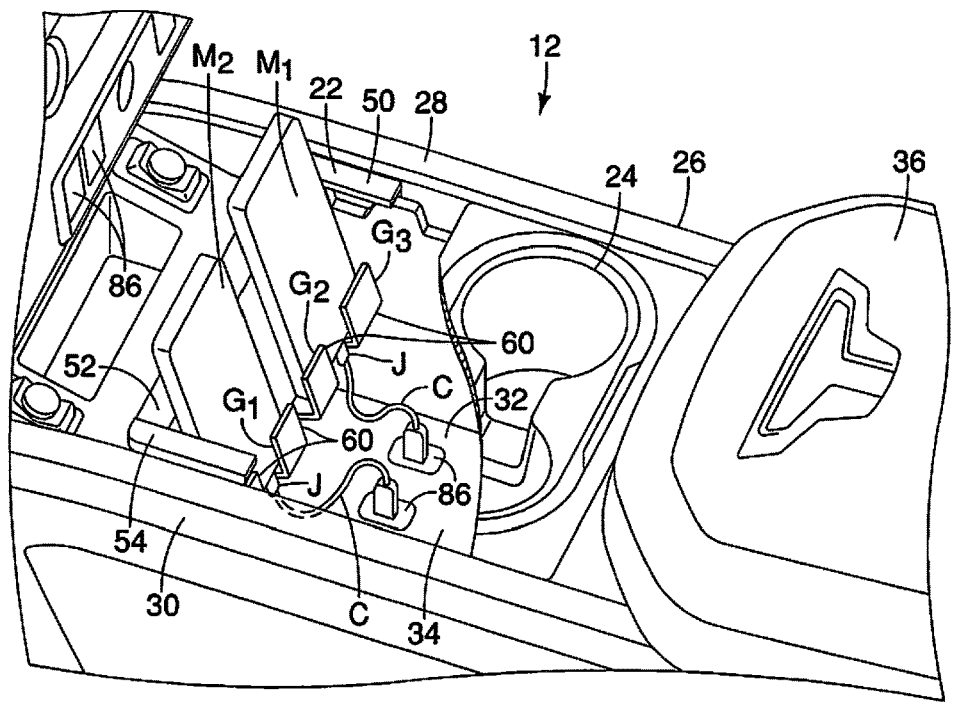
FIG. 7 another perspective view of the center console assembly, similar to FIG. 6, showing the phone holder tray installed to center console assembly with two mobile phones located within the phone holder tray showing routing of cables connecting the mobile phones to connection ports within the concaved storage area of the center console assembly in accordance with the first embodiment.

Alternatively (or additionally) as shown in FIG. 7, the console assembly 12 can include outlets 86 along one wall of the concaved storage area 32. The cables C can be plugged into the outlets 86. In this configuration, the cables C are at least partially hidden beneath the phone holder tray 22.

In the above described embodiment of the console 12, the mobile phones $M_1$ and $M_2$ can be any of a variety of mobile phones by a variety of manufactures. The phone supporting portion 52 is sufficiently wide in order to receive mobile phones with varying widths and heights. In the depicted embodiment, the mobile phones $M_1$ and $M_2$ are shown with identical dimensions. However, it should be understood that mobile phones with differing heights can be inserted into the phone supporting portion 52. In other words, the mobile phones $M_1$ and $M_2$ need not be identical.

As shown in FIGS. 24 and 25, a gap $G_4$ is defined between the phone tray holder 22 and the cup holder tray 24 with the phone tray holder 22 in the first of the plurality of retaining positions $P_1$, and the cup holder tray 24 in the fourth of the plurality of retaining portions $P_4$. The gap $G_4$ is sufficient to allow a passenger's hand H to fit between the phone tray holder 22 and the cup holder tray 24 and retrieve items in the concaved storage area 32.

Further, since the phone holder tray 22 can be installed to any of the retaining positions $P_1$, $P_2$, $P_3$, $P_4$ and $P_5$, it is possible for a vehicle operator to adjust the location of the phone holder tray 22 (and the cup holder tray 24) to any of a variety of positions to suit the needs and convenience of the vehicle operator.

SECOND EMBODIMENT

Figure 27:
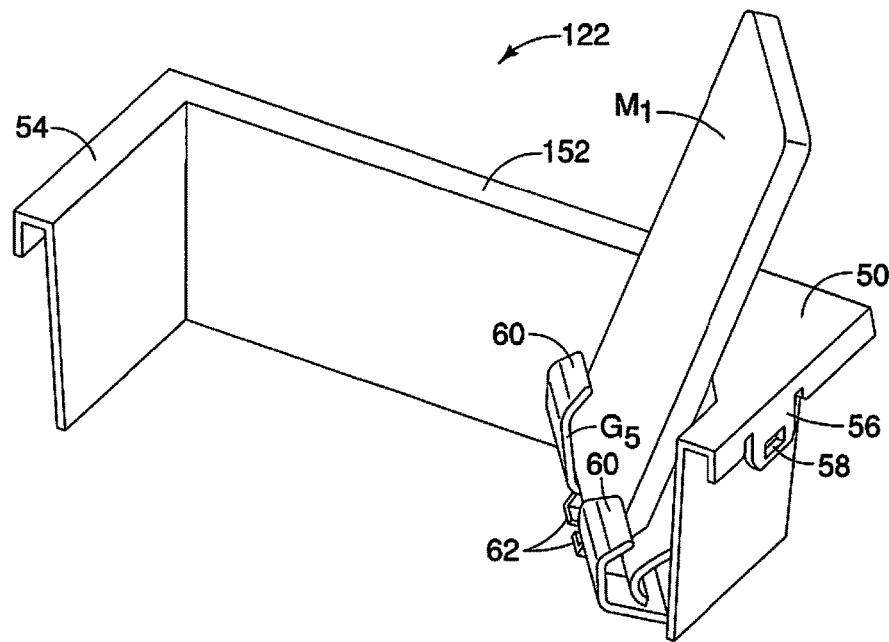
FIG. 27 is a second perspective view of the phone tray holder in accordance with the second embodiment.
Figure 28:
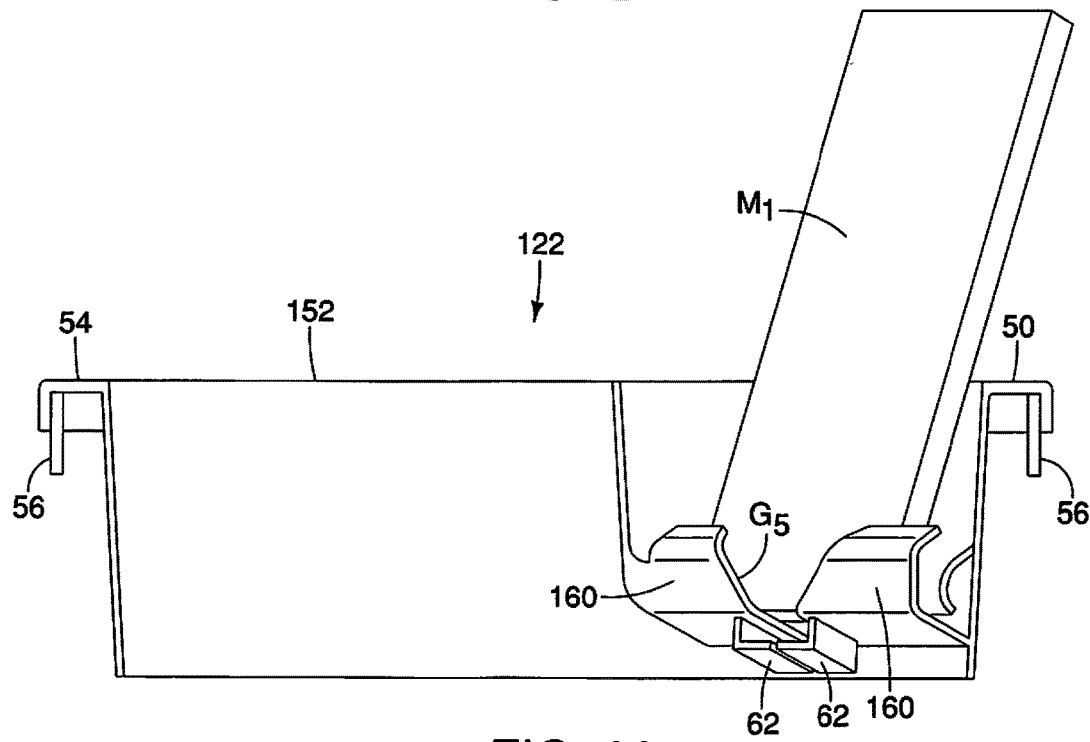
FIG. 28 is a front view of the phone tray holder in accordance with the second embodiment.

Referring now to FIGS. 26-28, a phone holder tray 122 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the console assembly 12 and the cup holder tray 24 are unchanged, and are as described above with respect to the first embodiment.

In the second embodiment, the phone holder tray 122 includes the first side portion 50 and the second side portion 54, as described above with respect to the first embodiment. The phone holder tray 122 includes a phone supporting portion 152 that replaces the phone supporting portion 52 of the first embodiment. The phone supporting portion 152 includes two wall sections 160 that are similar to the wall sections 60 as described above with respect to the first embodiment. However, in the first embodiment, the wall section 60 extend in a direction perpendicular to the first side portion 50 and the second side wall 54. In the second embodiment, the wall sections 160 are angled with respect to the second side wall 54. Further, the wall sections 160 are dimensioned to hold only one mobile phone $M_1$. A gap $G_5$ is defined centrally between the two wall sections 160 thereby allowing the cable C to extend from a lower surface of the mobile phone $M_1$ with the mobile phone $M_1$ inserted into the wall sections 160. The phone supporting portion 152 can further includes the electrical jack supporting surfaces 62a, as described above with respect to the first embodiment.

The features of the vehicle body structure 14, the console assembly 12 (other than the features relating to the phone holder tray 22 and attachment thereto) are conventional components that are well known in the art. Since such structures are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the re-configurable center console assembly. Accordingly, these terms, as utilized to describe the present invention should be interpreted relative to a vehicle equipped with the re-configurable center console assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A re-configurable center console assembly, comprising:
a center console assembly having a main body that includes a first side wall and a second side wall defining a concaved storage area therebetween, the first side wall and the second side wall further defining a plurality of retaining positions;
a phone holder tray having a first side portion, a phone supporting portion and a second side portion, the first side portion being configured to manually attached, detach and re-attach to the first side wall, and the second side portion being configured to attach, detach and re-attach to the second side wall such that the phone holder tray is installed to a first of the plurality of retaining positions and is detachable and re-attachable to a second of the plurality of retaining positions, the phone supporting portion being configured to support at least a first mobile phone in an upright orientation such that a display of the first mobile phone is visible within a passenger compartment of a vehicle; and
a cup tray holder configured to manually attached, detach and re-attach to the first side wall, and, attach, detach and re-attach to the second side wall at any of the plurality of retaining positions.

2. The re-configurable center console assembly according to claim 1, wherein
the phone supporting portion of the phone holder tray includes wall sections that are dimensioned and oriented to support two separate phones.

3. The re-configurable center console assembly according to claim 2, wherein
the wall sections of the phone supporting portion of the phone holder tray include a plurality of gaps dimensioned and positioned to receive cables attachable to respective bottom ends of each of the two separate phones.

4. The re-configurable center console assembly according to claim 3, wherein
the wall sections of the phone supporting portion of the phone holder tray include a plurality of pairs of electrical jack supporting surfaces located along opposite sides of each of the plurality of gaps dimensioned and positioned to receive corresponding electrical jacks of the cables.

5. The re-configurable center console assembly according to claim 1, wherein
the phone supporting portion of the phone holder tray includes wall sections that support a tablet.

6. The re-configurable center console assembly according to claim 5, wherein
the wall sections of the phone supporting portion of the phone holder tray include a centered gap dimensioned and positioned to receive a cable attachable to the tablet.

7. The re-configurable center console assembly according to claim 3, wherein
the wall sections of the phone supporting portion of the phone holder tray include a pair of electrical jack supporting surfaces located along opposite sides of the gap dimensioned and positioned to receive an electrical jack of the cable.

8. The re-configurable center console assembly according to claim 1, wherein
the cup holder tray has a third side portion, a cup holding portion and a fourth side portion, the third side portion being configured to manually attached, detach and re-attach to the first side wall, and the fourth side portion being configured to attach, detach and re-attach to the second side wall at any of the plurality of retaining positions such that the cup holder tray is installable to the second of the plurality of retaining positions with the phone holder tray attached at the first of the plurality of retaining positions and is detachable and re-attachable to the first of the plurality of retaining positions with the phone holder tray attached at the second of the plurality of retaining positions.

9. The re-configurable center console assembly according to claim 8, wherein
the cup holder tray includes two cup receiving concavities.

10. The re-configurable center console assembly according to claim 8, wherein
each of the plurality of retaining positions of the center console assembly are defined by aligned pairs of tray receiving concavities of the first side wall and the second side wall of the center console assembly, and
each of the first side portion and the second side portion of the phone holder tray includes a support section dimensioned and shaped to insert into any one of the aligned pairs of tray receiving concavities.

11. A re-configurable center console assembly comprising:
a center console assembly having a main body that includes a first side wall and a second side wall defining a concaved storage area therebetween, the first side wall and the second side wall further defining a plurality of retaining positions;
a phone holder tray having a first side portion, a phone supporting portion and a second side portion, the first side portion being configured to manually attached, detach and re-attach to the first side wall, and the second side portion being configured to attach, detach and re-attach to the second side wall such that the phone holder tray is installed to a first of the plurality of retaining positions and is detachable and re-attachable to a second of the plurality of retaining positions,
each of the aligned pairs of tray receiving concavities includes a projection therein, and
each of the first side portion and the second side portion of the phone holder tray includes a projection receiving section dimensioned and shaped to receive the projection of the tray receiving concavities with the support sections each of the first side portion and the second side portion of the phone holder tray inserted into one of the aligned pairs of tray receiving concavities.

12. The re-configurable center console assembly according to claim 1, wherein each of the plurality of retaining positions of the center console assembly are defined by aligned pairs of tray receiving concavities of the first side wall and the second side wall of the center console assembly, and each of the first side portion and the second side portion of the phone holder tray includes a support section dimensioned and shaped to insert into any one of the aligned pairs of tray receiving concavities.

13. A re-configurable center console assembly comprising:
a center console assembly having a main body that includes a first side wall and a second side wall defining a concaved storage area therebetween, the first side wall and the second side wall further defining a plurality of retaining positions;
a phone holder tray having a first side portion, a phone supporting portion and a second side portion, the first side portion being configured to manually attached, detach and re-attach to the first side wall, and the second side portion being configured to attach, detach and re-attach to the second side wall such that the phone holder tray is installed to a first of the plurality of retaining positions and is detachable and re-attachable to a second of the plurality of retaining positions,
each of the aligned pairs of tray receiving concavities includes a projection therein, and
each of the first side portion and the second side portion of the phone holder tray including a projection receiving section dimensioned and shaped to receive the projection of the tray receiving concavities with the support sections each of the first side portion and the second side portion of the phone holder tray inserted into one of the aligned pairs of tray receiving concavities.

14. The re-configurable center console assembly according to claim 8, wherein
the first of the plurality of retaining positions is located above a forward section of the concaved storage area and the second of the plurality of retaining positions is located above a rearward section the concaved storage area,
such that with the phone holder tray installed to the first of the plurality of retaining positions and the cup holder tray is installable to the second of the plurality of retaining positions, and
with the phone holder tray installed to the second of the plurality of retaining positions and the cup holder tray is installable to the first of the plurality of retaining positions.

15. The re-configurable center console assembly according to claim 14, wherein
the plurality of retaining positions further includes a third of the plurality retaining positions, a fourth of the plurality retaining positions and a fifth of the plurality retaining positions located at spaced apart locations between the first of the plurality of retaining positions and the second of the plurality of retaining positions, such that the phone holder tray is additionally installable into any one of the first, the second, the third, the fourth and the fifth of the plurality of retaining positions.

16. The re-configurable center console assembly according to claim 1, wherein
the first of the plurality of retaining positions is located above a forward section of the concaved storage area and the second of the plurality of retaining positions is located above a rearward section the concaved storage area.

17. The re-configurable center console assembly according to claim 14, wherein
the plurality of retaining positions further includes a third of the plurality retaining positions, a fourth of the plurality retaining positions and a fifth of the plurality retaining positions located at spaced apart locations between the first of the plurality of retaining positions and the second of the plurality of retaining positions, such that the phone holder tray is additionally installable into any one of the first, the second, the third, the fourth and the fifth of the plurality of retaining positions.

\* \* \* \* \*